(No Model.)

J. H. ROBERTS.
STOCK COLLAR.

No. 339,214. Patented Apr. 6, 1886.

WITNESSES

INVENTOR
John H. Roberts.
By
Attorneys

UNITED STATES PATENT OFFICE.

JOHN HARRISON ROBERTS, OF HEMPSTEAD, TEXAS.

STOCK-COLLAR.

SPECIFICATION forming part of Letters Patent No. 339,214, dated April 6, 1886.

Application filed October 19, 1885. Serial No. 180,355. (No model.)

*To all whom it may concern:*

Be it known that I, JOHN HARRISON ROBERTS, a citizen of the United States, residing at Hempstead, in the county of Waller and State of Texas, have invented a new and useful Improvement in Stock-Collars, of which the following is a specification, reference being had to the accompanying drawings.

My invention has relation to improvements in stock-collars; and the novelty consists in the peculiar construction, combination, and arrangement of the various parts for service, substantially as hereinafter fully set forth, and specifically pointed out in the claim.

My invention has for its object to provide a stock-collar, for the purpose of positively and unmistakably identifying cattle and other like stock, and to obviate the necessity of marking and branding cattle, &c., which shall be light, simple, strong, and durable in construction, thoroughly effective for the purposes designed, easily attached to and removed from the necks of cattle, &c., which shall be cheap and inexpensive of manufacture, and not liable to become lost, misplaced, broken, or detached by the animal in its efforts to release itself.

Figure 1:
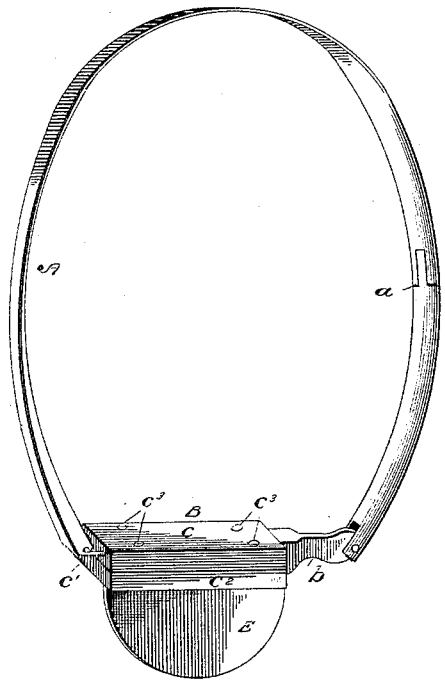
Figure 2:
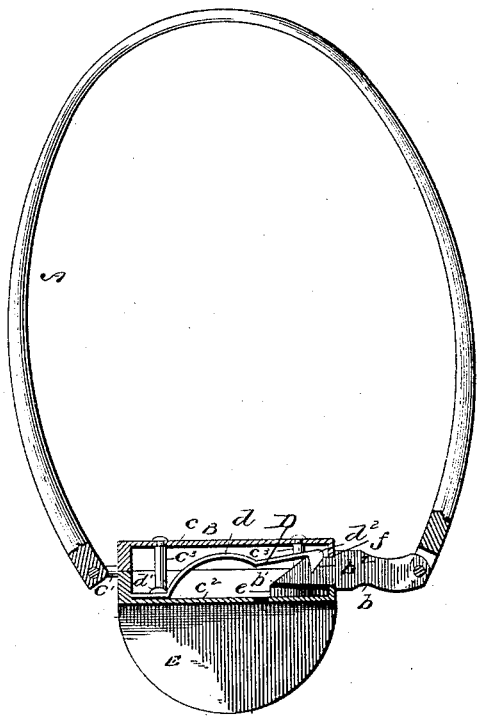
Figure 3:
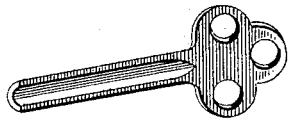

I have shown an embodiment of my invention in the annexed drawings, in which Figure 1 is a perspective view of a stock-collar embodying my invention. Fig. 2 is a longitudinal vertical sectional view to more clearly show parts of my preferred form of locking device. Fig. 3 is a view of the key.

Like letters of reference denote corresponding parts in the several figures of the accompanying drawings, referring to which—

A designates the collar, of the usual shape or form, and open at one end for the locking device B to detachably connect the collar ends together. The collar is of any preferred form, that herein shown comprising a thin metallic band flattened on the outer edge and rounded on the inner, to prevent chafing or cutting of the animal's neck around which it is fitted. The collar has preferably one end jointed, as at $a$, to permit its ready fitting over the animal's neck; and the lower end of the jointed arm carries a similar jointed locking-arm, $b$, the forward end of which is tapered, as at $b'$, and notched, as at $b^2$, for a purpose presently described. The other meeting end of the collar carries the lock B, suitably secured thereto in any suitable or preferable manner.

The lock-casing is preferably made rectangular in the present instance, and in two parts. One part of the lock-casing, $c$, has an arm or staple, $c'$, secured rigidly thereto or formed therewith; and this arm or staple $c'$ is rigidly secured to the free end of the collar or band, as clearly shown.

I will now proceed to describe my preferred form of locking device; but I would have it understood that I do not desire to limit myself to the construction shown, and more fully described presently, as I am aware that other devices of a like character may be substituted therefor with perhaps better results.

The lock-casing comprises two parts, $c c^2$, detachably fitted together, and one, $c$, rigidly secured to the collar, and the other removably secured to its fellow section. The removable section $c^2$ carries a series of projecting studs, $c^3$, which, when the sections of the lock-case are fitted together, project through apertures in the case-section $c$, and the ends of said studs are then headed down to secure said lock-case sections firmly and rigidly together.

D designates a spring, bent as at $d$, and rigidly secured at one end to one of case-sections, as at $d'$, and having a nib or shoulder, $d^2$, at its opposite end, said shoulder adapted to interlock with the notch $b^2$ of the jointed locking-arm $b$, to lock the two ends of the collar together.

$e$ designates a beveled guide-piece secured within the lock-casing beneath the shoulder $d^2$ of the locking-spring D, and adapted to serve as a guide to the beveled end $b'$ of the jointed locking-arm $b$. One end wall of the lock-casing has an opening, $f$, of a size sufficient to permit the end of the locking-arm $b$ to freely enter the case to engage the locking-spring D.

E designates a plate, of any preferred form or metal, cast with or rigidly secured to the lock-casing, and on this plate is stamped, cut, embossed, or otherwise indorsed or marked the name, residence, or other memorandum or note of the owner of the cattle around which the band or collar is fitted. The shape of the plate E may be varied, and it may be made of any soft or other metal, and it may be secured to the lock-casing.

A bell or other suitable device may be suspended from the plate E, or from the lock-case or other part of the collar, to give warning, and enable the owner to find the cattle.

Horses, mules, sheep, cattle, and other animals that are congregated in droves may wear the device; and it is made to fit the animal snugly to prevent catching in briers, grass, &c., and also to prevent displacement when the animal scratches itself.

It is apparent that my improved stock-collar enables the owner of any stray or lost cattle to positively and unmistakably identify them; that it can be readily and quickly adjusted; that the device is simple, light, strong, and durable in its construction; cannot be easily removed nor broken; is comparatively cheap, inexpensive, and easy of manufacture; and that it will not injure the stock, and entirely obviates the necessity of branding and marking.

The operation of my invention is obvious. To lock the device upon the neck of an animal, the collar or band is first adjusted and the notched locking-arm $b$ forced into the aperture $f$ until the spring-shoulder $d^2$ engages the notch $b^2$. To unlock the device it is only necessary to force the key shown in Fig. 3 against one end of the spring D through an opening in the lock-case until the shoulder of said spring is released from engagement with the notched locking-arm $b$, which is then withdrawn from the lock-case and the collar removed.

Having thus fully described my invention, what I claim as new, and desire to secure by Letters Patent, is—

A stock-collar comprising an open band having a jointed notched locking-arm, a lock-case rigidly secured to the opposite end of the collar, and carrying a spring-bolt adapted to engage the notched arm, and a metallic name-plate secured to the lock-casing, substantially as described.

In testimony that I claim the foregoing as my own I have hereto affixed my signature in presence of two witnesses.

JOHN HARRISON ROBERTS.

Witnesses:
J. W. BUCK,
J. B. GEE.